United States Patent
Hisatsugu

(10) Patent No.: US 10,095,310 B2
(45) Date of Patent: Oct. 9, 2018

(54) INPUT APPARATUS

(71) Applicant: DENSO CORPORATION, Kariya, Aichi-pref. (JP)

(72) Inventor: Shinsuke Hisatsugu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 82 days.

(21) Appl. No.: 15/110,146

(22) PCT Filed: Dec. 24, 2014

(86) PCT No.: PCT/JP2014/006414
§ 371 (c)(1),
(2) Date: Jul. 7, 2016

(87) PCT Pub. No.: WO2015/104773
PCT Pub. Date: Jul. 16, 2015

(65) Prior Publication Data
US 2016/0328018 A1    Nov. 10, 2016

(30) Foreign Application Priority Data
Jan. 9, 2014 (JP) ................................. 2014-002702

(51) Int. Cl.
| | |
|---|---|
| *G06F 3/033* | (2013.01) |
| *G06F 3/01* | (2006.01) |
| *G06F 3/0354* | (2013.01) |
| *G06F 3/02* | (2006.01) |
| *G06F 3/0362* | (2013.01) |

(52) U.S. Cl.
CPC ............... *G06F 3/016* (2013.01); *G06F 3/01* (2013.01); *G06F 3/0202* (2013.01); *G06F 3/0354* (2013.01); *G06F 3/0362* (2013.01)

(58) Field of Classification Search
CPC ...... G06F 3/016; G06F 3/0202; G06F 3/0362; G06F 3/0354; G06F 3/01
See application file for complete search history.

(56) References Cited

U.S. PATENT DOCUMENTS

| | | | | |
|---|---|---|---|---|
| 6,816,049 | B2 * | 11/2004 | Watanabe | G06F 3/016 335/222 |
| 2002/0105495 | A1 * | 8/2002 | Numata | H01H 25/002 345/156 |
| 2004/0125082 | A1 * | 7/2004 | Akieda | G06F 3/0354 345/156 |

FOREIGN PATENT DOCUMENTS

| | | |
|---|---|---|
| JP | 4142430 B2 | 9/2008 |
| JP | 2011232946 A | 11/2011 |
| WO | WO-2014174793 A1 | 10/2014 |

(Continued)

*Primary Examiner* — Jonathan Boyd
(74) *Attorney, Agent, or Firm* — Harness, Dickey & Pierce, P.L.C.

(57) ABSTRACT

An input apparatus includes an input device, a support device, a reaction force generator and an adjustment structure. The reaction force generator includes a magnetic pole formation part, a coil, and a magnetic flux induction part, and that exerts electromagnetic force, which is generated by an application of current to the coil, on the input device as operation reaction force in a direction along the operation plane. The adjustment structure causes pressing force to increase or decrease in a direction where the input device intersects the operation plane by adjusting a total of magnetic attraction force obtained by the magnetic pole formation part attracting the magnetic flux induction part.

14 Claims, 7 Drawing Sheets

(56) References Cited

FOREIGN PATENT DOCUMENTS

| WO | WO-2015064038 A1 | 5/2015 |
|----|------------------|--------|
| WO | WO-2015097997 A1 | 7/2015 |

\* cited by examiner

INPUT APPARATUS

CROSS REFERENCE TO RELATED APPLICATIONS

This application is a U.S. National Phase Application under 35 U.S.C. 371 of International Application No. PCT/JP2014/006414 filed on Dec. 24, 2014 and published in Japanese as WO 2015/104773 A1 on Jul. 16, 2015. This application is based on and claims the benefit of priority from Japanese Patent Application No. 2014-002702 filed on Jan. 9, 2014. The entire disclosures of all of the above applications are incorporated herein by reference.

TECHNICAL FIELD

The present disclosure relates to an input apparatus to which an operation force is inputted.

BACKGROUND ART

The Patent Literature 1 discloses the configuration of an input apparatus that includes a tactile sensing member to be inputted by an operation force; and further includes an actuator supported by the input of the operation force of the tactile sensing member so as to be displaceable. The actuator disclosed in the Patent Literature 1 includes: a magnet that forms a magnetic pole; a coil that enables the magnetic flux generated by the magnetic pole to pass through; and two yoke plates that inducts the magnetic flux generated by the magnetic on the coil. The actuator makes the electromagnetic force generated by the current to the coil as the operation reaction force through the tactile sensing member so as to act on an operator so that the operation reaction force may act as the information transfer through the tactile of the operator.

With regard to the input apparatus disclosed in the Patent Literature 1, the weight of, for example, the tactile sensing member configured to be displaceable may get larger or smaller along with a change in specification variation through a request such as design and the strength level of the operation reaction force. Accordingly, the pressing force acting on a member such as a casing for supporting a tactile sensing member exerted from the tactile sensing member is also changed. As a result, the weight of the tactile sensing member may get smaller that exceeds an appropriate weight range so that, for example, the wobble and vibration caused by lack of loading force may be generated on the tactile sensing member. In addition, the weight of the tactile sensing member may get larger that exceeds the appropriate weight range so that it is possible to have an excess increase in the frictional force acting on the tactile sensing member.

As described above, with regard to the prior configuration, the force acting between an input device and a support device cannot be arbitrarily adjusted; therefore, for example, the frictional resistance generated along with the movement of the input device cannot be optimized.

PRIOR ART LITERATURES

Patent Literature

Patent Literature 1: JP-2011-232946-A

SUMMARY OF INVENTION

It is an object of the present disclosure to provide an input apparatus that improves an operation feeling of an operation causing an input device of, for example, a tactile sensing member to move.

An input apparatus according to an aspect of the present disclosure includes an input device, a support device, a reaction force generator and an adjustment structure. The input device receives an input of an operation force in a direction along an operation plane. The support device supports the input device so as to enable the input device to move along the operation plane through the input of the operation force. The reaction force generator includes a magnetic pole formation part for forming a magnetic pole; a coil for enabling a magnetic flux generated by the magnetic pole formation part passing through the coil; and a magnetic flux induction part for inducting the magnetic flux generated by the magnetic pole formation part at the coil. Additionally, the reaction force generator exerts the electromagnetic force generated by the application of current to the coil on the input device as the operation reaction force to a direction along the operation plane. The adjustment structure increases or decreases a pressing force pressing the support device in a direction where the input device intersects with the operation plane by adjusting the total of the magnetic attraction force obtained by the magnetic pole formation part attracting the magnetic flux induction part.

The inventor in the present disclosure newly focuses on the magnetic attraction force generated between the magnetic pole formation part and the magnetic induction part, and arranges the adjustment structure for adjusting the magnetic attraction force at the input apparatus. The adjustment structure adjusts the total of the magnetic attraction force between the magnetic pole formation part and the magnetic flux induction part so as to increase or decrease the pressing force between the input device and the support device. Therefore, the frictional resistance between the input device and the support device to be increased or decreased in accordance with the pressing force can be arbitrarily adjusted by the adjustment structure. Accordingly, since the frictional resistance generated with the movement of the input device can be optimized, therefore, the improvement in the operational feeling to the operation for moving the input device through the input of the input force can be achieved.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
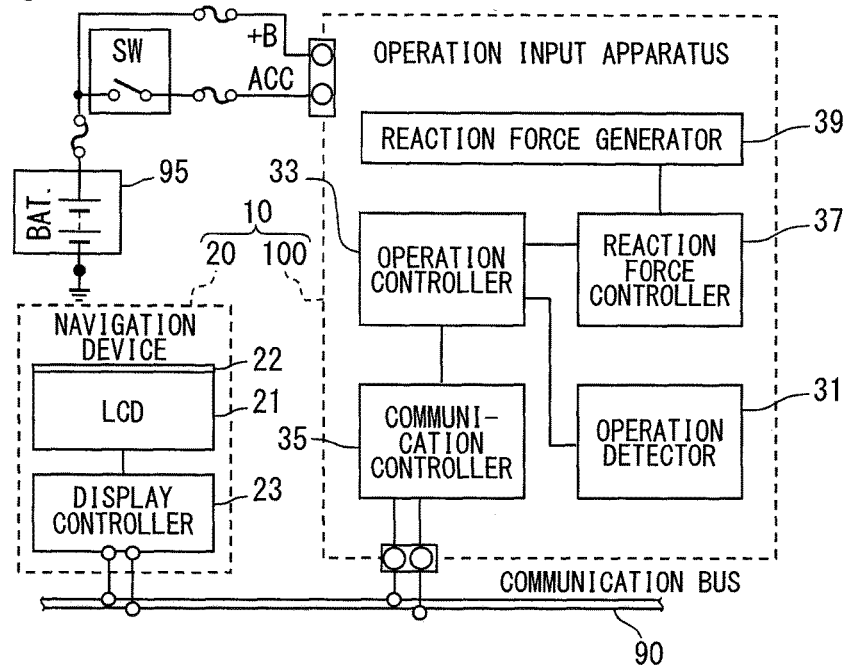
FIG. 1 is a drawing that illustrates a configuration of a display system that includes an operation input apparatus according to a first embodiment of the present disclosure.

The following describes a plurality of embodiments according to the present disclosure. It is noted that the configuration elements corresponding to each of the embodiments are appended by the same reference numerals, and therefore the description is not repeated. When only one part of the configuration in one embodiment is described, the other parts of the configuration may apply the configuration in the other embodiments described beforehand. The present disclosure is not restricted to the combination of the configurations explicitly described in each of the embodiments; a part of the configurations in the plurality of embodiments may also be combined even without explicitly described in the present disclosure as long as falling within the spirit and scope of the present disclosure. The combination of the configurations not explicitly described in the plurality of embodiments and modification examples is described in the following.

First Embodiment

Figure 2:
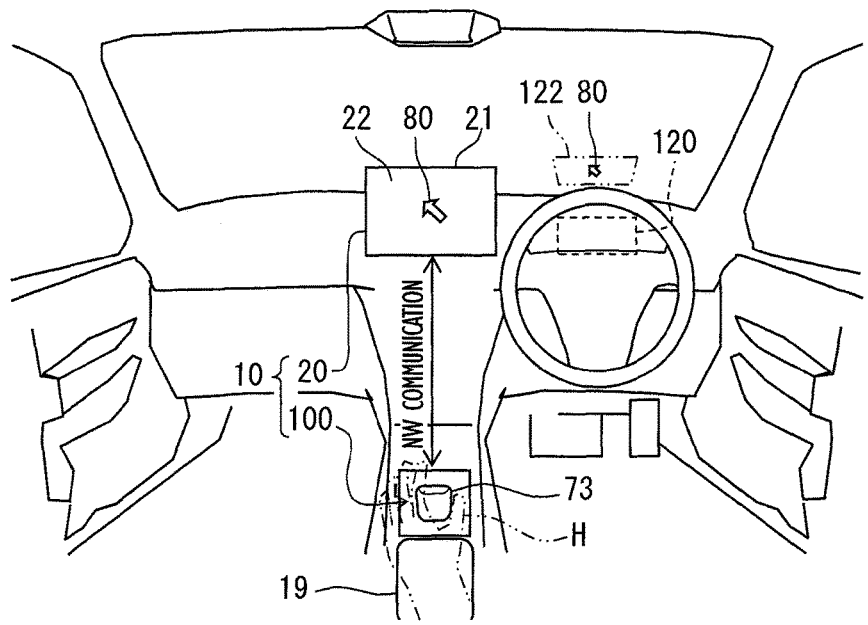
FIG. 2 is a drawing that illustrates an arrangement of the operation input apparatus inside a vehicle compartment.

An operation input apparatus 100 according to a first embodiment of the present embodiment illustrated in FIG. 1 includes: a vehicular display device that is mounted to a vehicle and arranged inside the vehicle compartment; and a display system 10 along with, for example, a navigation device 20 or a head-up display device 120 (see FIG. 2). As shown in FIG. 2, the operation input apparatus 100 is arranged at a position adjacent to a palm rest at the center console of the vehicle and makes an operation knob 73 to expose in a range in which the operator's hand easily reaches. As the operation force exerted by a hand H of the operator is inputted to the operation knob 73, the direction of the inputted operation force changes in position.

The navigation device 20 is arranged inside the instrument panel of the vehicle, and makes a display screen 22 to expose toward a driver seat. The display screen 22 displays a plurality of icons related to a predetermined function and a pointer 80 that is used for selecting any icon. When the operation force in a horizontal direction is inputted to the operation knob 73, the pointer 80 moves in a direction which corresponds to the input direction of the operation force acting on the display screen 22. As shown in FIG. 1 and FIG. 2, the navigation device 20 is connected to a communication bus 90 so that is enabled to have communication with, for example, the operation input apparatus 100 on a network. The navigation device 20 includes: a display controller that draws an image displayed on the display screen 22; and a liquid crystal display 21 that displays the image drew by the display controller 23 on the display screen continuously.

As shown in FIG. 1, the operation input apparatus 100 is connected with, for example, the communication bus 90 and an external battery 95. The operation input apparatus 100 communicates with the navigation device to be arranged away from the operation input apparatus 100 through the communication bus 95.

The operation input apparatus 100 is electrically configured by, for example, a communication controller 35, an operation detector 31, a reaction force generator 39, a reaction force controller 37 and an operation controller 33.

The communication controller 35 outputs information processed by the operation controller 33 to the communication network 90. In addition, the communication controller 35 obtains information outputted to the communication bus 90 from other vehicular devices 4 and then outputs the information to the operation controller 33. The operation detector 31 detects a position of the operation knob 73 (see FIG. 2) which is moved by the input of the operation force. The operation detector 31 outputs the operation information showing the position of the detected operation knob 73 to the operation controller 33.

The reaction force generator 39 is a configuration that generates an operation reaction force on the operation knob 73 (see FIG. 2), and includes an actuator such as a voice coil motor. When the reaction force generator 39 applies an operation reaction force on the operation knob 73 in a case where, for example, the pointer 80 overlaps with the icon on the display screen 22 (see FIG. 2), the reaction force generator 39 causes the operator to have tactile sensing of a simulated icon with the so-called reaction force feedback. The reaction force controller 37 is configured by, for example, a microcomputer for operating, for example, a variety of computation processes. The reaction force generator 39 controls the direction and strength level of the operation reaction force to be applied to the operation knob 73 from the reaction force generator 39 based on the reaction force information obtained from the operation controller 33.

The operation controller 33 is configured by, for example, a microcomputer for performing a variety of computation processes. The operation controller 33 obtains operation information detected by the operation detector 31, and outputs the operation information through the communication controller 35 to the communication bus 90. In addition, the operation controller 33 computes the direction and strength of the operation reaction force to be applied to the operation knob 73 (see FIG. 2), and outputs the computation result as the reaction force information to the reaction force controller 37.

Figure 3:
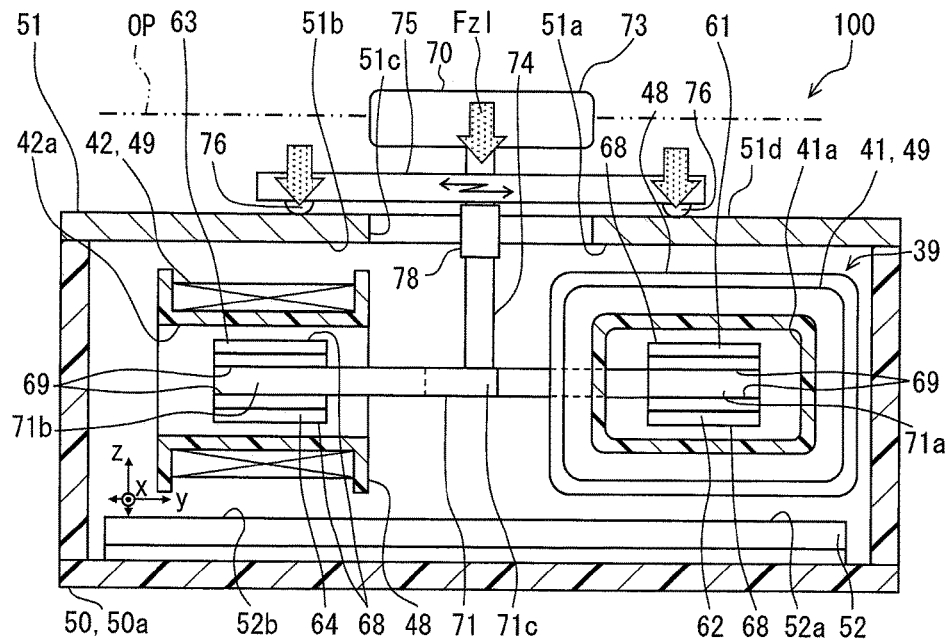
FIG. 3 is a cross section view that illustrates a mechanical configuration of the operation input apparatus.

The operation input apparatus 100 is mechanically configured by a movable device 70 and a fixing device 50 as shown in FIG. 3.

When the operation force in an x-direction and y-direction along a virtual operation plane OP is inputted to the operation knob 73, the movable device 70 returns to a referential position as the reference once released from the applied operation force. The movable range in the x-direction and the y-direction for the movable device 70 is defined by the fixing device 50.

The movable device 70 includes a knob base 74, a slider 75, and the above-mentioned operation knob 73. The knob base 74 is extended from the operation knob 73 along the z-axis perpendicular to the operation plane OP, and holds the after-mentioned inner yoke 71. In the present disclosure, the term "perpendicular" does not only imply to be strictly perpendicular, but it may be substantially perpendicular as well. The slider 75 is arranged at the knob base 74 and formed into a flat plate shape along the operation plane OP. A plurality of sliding protrusions 76 are arranged to be protruded in a hemispherical shape directed to the fixing device 50 on the slider 75. The slider 75 makes the tip of each of the plurality of sliding protrusions 76 to be in contact with the surface of the fixing device 50 and to be placed on the fixing device 50. The slider 75 controls each of the plurality of sliding protrusions 76 to be slid and moved on the fixing device with the input of the operation force.

The fixing device 50 includes a circuit board and a housing 50a that stores the circuit board. The after-mentioned two outer yokes 51, 52 are fixed to the fixing device 50. For example, the microcomputer that includes the operation controller 33 and the reaction force controller 37 (see FIG. 1 for both members) is mounted on the circuit board. The housing 50a supports the movable device 70 to be relatively displaceable.

Figure 4:
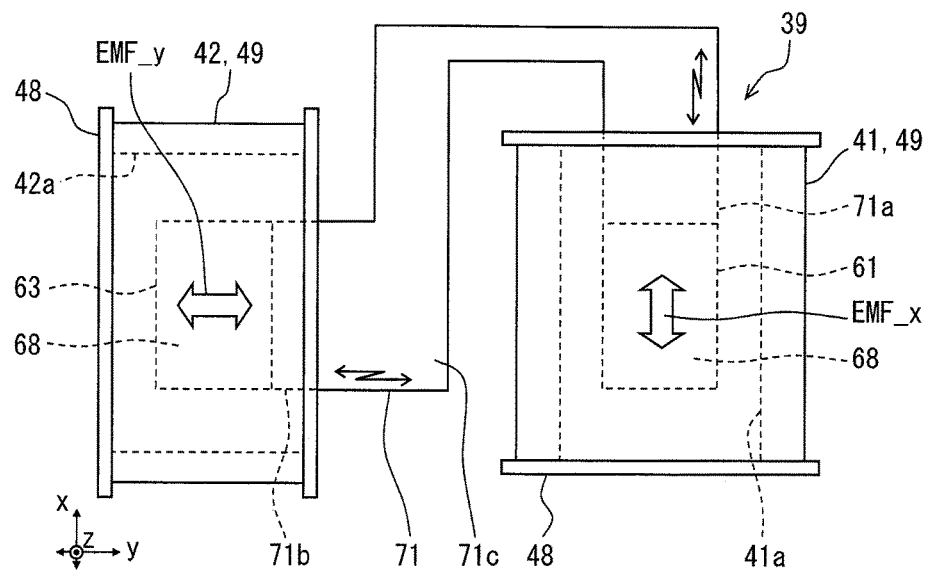
FIG. 4 is a plan view that illustrates a reaction force generator.

The reaction force generator 39 illustrated in FIGS. 3 and 4 carries pit reaction force feedback between the movable device 70 and the fixing device 50. The reaction force generator 39 includes two voice coil motors so as to act as an actuator to generate the electromagnetic forces EMF_x and EMF_y to each of the respective direction along the operation plane OP. The reaction force generator 39 is configured by, for example, two coils 41, 42, four magnets 61 to 64, the inner yoke 71 and two outer yokes 51, 52.

Each of the coils 41, 42 is made of a wire made of non-magnetic material such as copper as a winding 49, and is formed by winding around a flat cylindrical bobbin 48. For each of the coils 41, 42, the traverse plane perpendicular to the winding axial direction of the winding 49 is formed in a rectangular shape. The winding 49 is wound so as to make the thickness of each of the coils 41, 42 to be up to, for example, 3 mm. With regard to each of the coils 41, 42, accommodation chambers 41a, 42a are arranged to extend in the winding axial direction at the inner circumferential side of the bobbin 48 and the winding 49. Each of the coils 41, 42 is electrically connected to the reaction force controller 37 (see FIG. 1) through wiring pattern arranged on the circuit board. Current is individually applied to each winding 49 by the reaction force controller 37.

The two coils 41, 42 provide a very small gap each other and are lined up along the y-axis. Each of the two coils 41, 42 are fixed and directed to the fixing device 50 so as to be along the operation plane OP. The winding axial direction of one coil 41 (hereinafter referred to as a "first coil") is along the x-axis. The winding axial direction of another coil 42 (hereinafter referred to as a "second coil") is along the y-axis. The side surface of each of the coils 41, 42 is formed substantially into a quadrilateral shape, and each side of the quadrilateral shape is along the x-axis or the y-axis.

Each of the magnets 61 to 64 is made of, for example, a neodymium magnet, and is formed in a quadrilateral plate having a longitudinal direction. A mounting surface 69 and a magnetized surface 68, which are formed into a smooth planar shape, are arranged at each of the coils 61 to 64. The mounting surface 69 is mounted to the inner yoke 71, and the length of the mounting surface is directed along the y-axis.

Two magnets 61, 62 are accommodated into the accommodation chamber 41a of the first coil 41, and are arranged so as to sandwich the inner yoke 71 from both sides in the z-axis direction. The magnets 61, 62 are lined up in the z-axis direction perpendicular to the operation plane OP so that the magnetized surface 68 is along the operation plane OP. The magnetized surfaces 68 on the respective magnets 61, 62 supported by the inner yoke 71 are mutually facing in different directions with respect to the z-direction. A predetermined spacing is kept between the magnetized surfaces 68 in the z-axis direction, and the magnetized surface 68 is opposite to the inner circumferential surface of the first coil 41. The magnetic poles formed on each magnetized surface 68 on the respective magnets 61, 62 are mutually identical.

The other two magnets 63, 64 are stored inside the accommodation chamber 42a of the second coil 42, and are arranged to sandwich the inner yoke 71 from both sides in the z-axis direction. The magnets 63, 64 are lined up in the z-axis direction perpendicular to the operation plane OP so that the magnetized surface 68 is along the operation plane OP. The magnetized surfaces 68 on the respective magnets 63, 64 supported by the inner yoke 71 are mutually facing in different directions with respect to the z-direction. A predetermined spacing is kept between the magnetized surfaces 68 in the z-axis direction, and the magnetized surface 68 is opposite to the inner circumferential surface of the second coil 42. The magnetic poles formed on each magnetized surface 68 on the respective magnets 63, 64 are mutually identical; however, are different from the magnetic poles of the magnetized surfaces 68 on the magnets 61, 62.

The inner yoke 71 is made of magnetic material such as soft iron and electrical steel. The inner yoke 71 is arranged between two outer yokes 51, 52. The inner yoke 71 is suspended by the knob base 74 in a state of being away from the coils 41, 42. The inner yoke 71 includes: two magnet-side yoke parts 71a, 71b formed into a flat plate; and a connecting part 71c that connects the both of the magnet-side yoke parts 71a, 71b.

The magnet-side yoke part (hereinafter referred to as a "first magnet-side yoke part") 71a is inserted into the accommodation chamber 41a of the first coil 41. The mounting surfaces 69 on the respective magnets 61, 62 are mounted to both surfaces of the first magnet-side yoke part 71a stored into the accommodation chamber 41a. The magnet-side yoke part (hereinafter referred to as a "second magnet-side yoke part") 71b is inserted into the accommodation chamber 42a of the second coil 42. The mounting surfaces 69 on the respective magnets 63, 64 are mounted to both surfaces of the second magnet-side yoke part 71b stored into the accommodation chamber 42a.

The connecting part 71 is bent into an "L" shape along the coils 41, 42. Spacing in accordance with the maximum stroke quantity of the operation knob 73 is provided between the connecting part 73 and each of the coils 41, 42. The inner yoke 71 is formed into a shape that extends from the accommodation chamber 41a of the first coil 41 to the accommodation chamber 42a of the second coil 42 by making the connecting part 71c connected to the two magnet-side yoke parts 71a, 71b.

The outer yokes 51, 52 are made of magnetic material such as soft iron and electromagnetic steel plate as similar to the inner yoke 71. Each of the outer yokes 51, 52 is formed into a rectangular shape. The outer yokes 51, 52 are respectively arranged at both sides of the two coils 41, 42 in the z-axis direction, and is arranged to be opposite to each other so as to sandwich the coils 41, 42.

The outer yoke (hereinafter referred to as an "upper arm outer yoke) 51 as one of the two outer yokes 51, 52 closer to the operation knob 73 is fixed to the housing 50a as a lid body of the housing 50a. The upper arm outer yoke 51 has a first opposing surface 51a, a second opposing surface 51b, an opening 51c and a sliding surface 51d.

The first opposing surface 51a and the second opposing surface 51b as two respective surfaces of the upper arm outer yoke 51 are formed as first-side surfaces facing the respective coils 41, 42 side. The first opposing surface 51a is opposed to the magnetized surface 68 of the magnet 61. And the first opposing surface 51a and the magnetized surface 68 are arranged so as to sandwich the first coil 41 from both the inside and outside. The second opposing surface 51b is opposed to the magnetized surface 68 of the magnet 62. And the second opposing surface 51b and the magnetized surface 68 are arranged so as to sandwich the second coil 42 from both the inside and outside.

The opening 51c is arranged at the center portion of the upper arm outer yoke 51, and penetrates through the upper arm outer yoke 51 in a plate-thickness direction. The opening 51c enables the knob base 74 to pass through from the operation knob 73 to the inner yoke 71. The sliding surface 51d as one of the two surfaces of the upper arm outer yoke 51 is formed as the second-side surface facing the operation knob 73 side. The sliding surface 51d is formed as a planar shape along the operation plane OP. The slider 75 is placed on the sliding surface 51d. The sliding surface 51d supports the plurality of sliding protrusions 76 to be slidable.

The outer yoke (hereinafter referred to as a "lower arm outer yoke") 52 as one of the outer yokes 51, 52 farther from the operation knob 73 is fixed inside the housing 50a. The lower arm outer yoke 52 has a first opposing surface 52a and a second opposing surface 52b. The first opposing surface 52a and the second opposing surface 52b as both surfaces of the lower arm outer yoke 52 are formed as first-side surfaces facing the respective coils 41, 42 side. The first opposing surface 52a is opposed to the magnetized surface 68 of the magnet 62. And the second opposing surface 52a and the magnetized surface 68 are arranged so as to sandwich the first coil 41 from both the inside and outside. The second opposing surface 52b is opposed to the magnetized surface 68 of the magnet 62. And the second opposing surface 52b and the magnetized surface 68 are arranged so as to sandwich the second coil 42 from both the inside and outside.

The inner yoke 71 and two outer yokes 51, 52 forms a magnetic circuit for inducting a magnetic flux generated by the magnets 61 to 64 on the respective coils 41, 42. In this magnetic circuit, the magnetic flux generated by the two magnets 61, 62 penetrates (or passes through) the winding 49 of the first coil 41 in the z-axis direction, and enters the outer yokes 51, 52 from the first opposing surface 51a and the second opposing surface 52a and is directed to the second opposing surface 51b and the second opposing surface 52b. Moreover, the magnetic flux generated by the two magnets 63, 64 penetrates (or passes through) the winding 49 of the second coil 42 in the z-axis direction from the second opposing surface 51b and the second opposing surface 52b and enters the second magnet side yoke part 71b. Furthermore, the magnetic flux pass through the connecting part 71c inside the inner yoke 71 and is directed to the first magnetic side yoke part 71a. As described above, the magnetic flux density passing through the winding 49 of each coil is increased with the formation of the magnetic circuit across both voice coil motors.

In the reaction force generator 39 as described above, the electromagnetic force EMF_x in the x-axis direction is formed between the first coil 49 and each of the magnets 61, 62 with the application of the current supplied to the first coil 41. Similarly, the electromagnetic force EMF_y in the y-axis direction is formed between the second coil 42 and each of the magnets 63, 64 with the application of the current supplied to the second coil 42. The direction of each of the electromagnetic forces EMF_x, EMF_y is reversed by reversing the current supplied to each of the coils 41, 42. The strength level of each of the electromagnetic forces EMF_x, EMF_y can be controlled by adjusting the amount of current supplied to each of the coils 41, 42.

In the following, the adjustment structure 78 provided in the operation input apparatus 100 is described in detail. The adjustment structure 78 can be adjusted in the length in the z-axis direction from the slider 75 to the inner yoke 71. The adjustment structure 78 has a stretching mechanism for stretching the knob base 74, and can arbitrarily define the position of the inner yoke 71 in the z-axis direction. The adjustment structure 78 can adjust the frictional resistance caused between each of the plurality of protrusions 76 and the sliding surface 51d while moving the movable device 70 by adjusting the position of the inner yoke in the z-axis direction. The following describes the working mechanism based on FIGS. 5 and 6.

The magnets 61 to 64 generate magnetic attraction force for drawing one opposing surface among the first opposing surfaces 51a, 52a and the second opposing surfaces 51b, 52b. Accordingly, the magnetic attraction force −Fzm in a downward direction directed to the lower arm outer yoke 52 along the z-axis and the magnetic attraction force Fzm in an upward direction directed to the upper arm outer yoke 51 along the z-axis act on the inner yoke 71 for holding the magnets 61 to 64.

Figure 5:
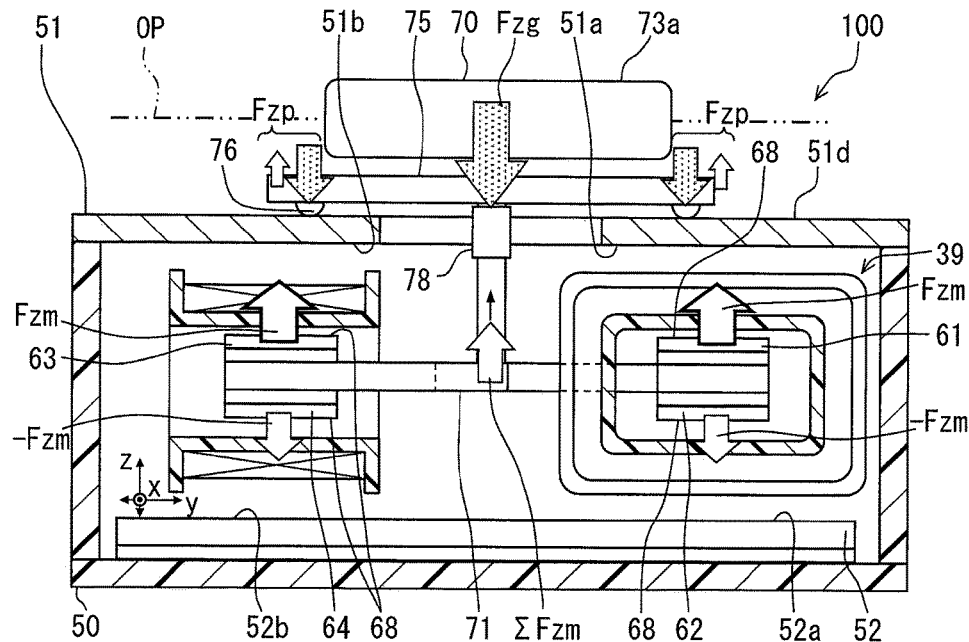
FIG. 5 is a drawing that illustrates working mechanism in which a pressing force is reduced by an adjustment structure in accordance with a specification having a large-scale operation knob.

As illustrated in FIG. 5, when the adjustment structure 78 makes the position of the inner yoke 71 to be closer to the upper arm outer yoke 51, the distance between the magnets 61, 63 and the upper outer yoke 51 gets shorter than the distance between the magnets 62, 64 and the lower outer yoke 52. Thus, with a change in the distance between each of the opposing surfaces 51a, 52a, 51b, 52b and the magnetized surface 68, which is placed oppositely individually to the opposing surfaces 51a, 52a, 51b, 52b, the magnetic attraction force Fzm in the upward direction gets larger than the magnetic attraction force −Fzm in the downward direction. Accordingly, the total force of the magnet attraction force Fzm for pulling each of the outer yokes 51, 52 by each of the magnets 61 to 64 is in the upward direction (see ΣFzm in FIG. 5). The upward force formed with the total of the magnetic attraction force Fzm gets larger as the distance between the inner yoke 71 and the upper outer yoke 51 becomes shorter.

Figure 6:
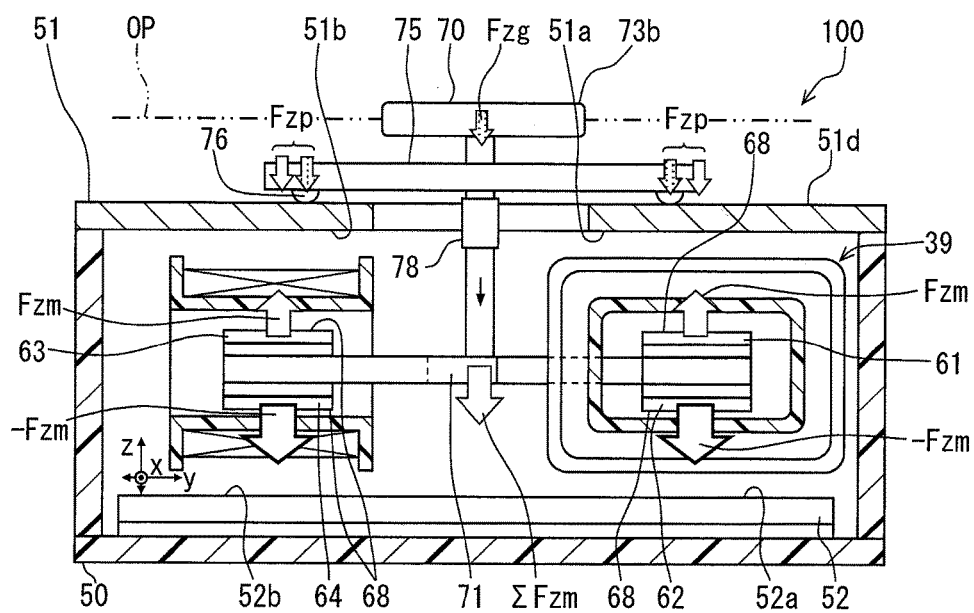
FIG. 6 is a drawing that illustrates working mechanism in which a pressing force is increased in accordance with a specification having a small-scale operation knob.

On the other hands, as shown in FIG. 6, as the adjustment structure 78 makes the position of the inner yoke 71 to be closer to the lower arm outer yoke 52, the distance between the magnets 62, 64 and the lower arm outer yoke 51 becomes shorter than the distance between the magnets 61, 63 and the upper arm outer yoke 51. Therefore, the magnetic attraction force −Fzm in the downward direction is larger than the magnetic attraction force Fzm in the upward direction. Accordingly, the total force of the magnet attraction force Fzm is in the downward direction (see ΣFzm in FIG. 6). The downward force formed with the total of the magnetic attraction force Fzm gets larger as the distance between the inner yoke 71 and the upper outer yoke 52 becomes shorter.

The operation input apparatuses 100 in FIGS. 5 and 6 are different in the weight of the operation knob. The operation knob 73a illustrated in FIG. 5 is configured to be larger and heavier than the standard operation knob 73 (see FIG. 1). Therefore, the load Fzg acting on the slider 75 from the operation knob 73a is larger than the load Fzg acting on the slider 75 from the standard operation knob 73. Accordingly, with the adjustment of the position of the inner yoke 71 performed by the above-mentioned adjustment structure 78, the total force of the magnetic attraction force Fzm is in the upward direction. As described above, the pressing force Fzp, which is obtained by the movable device 70 pressing on the sliding surface 51d in the downward direction through the plurality of sliding protrusions 76 of the slider 75, is reduced caused by the total force of the magnetic attraction force Fzm. As a result, the frictional resistance caused between the sliding protrusion 76 and the sliding surface 51d is adjustable with the function of the adjustment structure 78 as corresponding to a case of providing the standard operation knob 73.

On the other hands, the operation knob 73b illustrated in FIG. 6 is configured to be larger and heavier than the standard operation knob 73 (see FIG. 1). Therefore, the load Fzg acting on the slider 75 from the operation knob 73b is smaller than the load Fzg acting on the slider 75 from the standard operation knob 73. Accordingly, with the adjustment of the position of the inner yoke 71 performed by the above-mentioned adjustment structure 78, the total force of the magnetic attraction force Fzm is in the downward direction. As described above, the pressing force Fzp, which is obtained by the movable device 70 pressing on the sliding surface 51d in the downward direction through the plurality of sliding protrusions 76 of the slider 75, is increased caused by the total force of the magnetic attraction force Fzm. As a result, the frictional resistance caused between the sliding protrusion 76 and the sliding surface 51d is adjustable with the function of the adjustment structure 78 as corresponding to a case of providing the standard operation knob 73.

According to the first embodiment described above, the pressing force acting on the fixing device 50 from the movable device 70 can be increased or decreased with the adjustment of the total force of the magnetic attraction force Fzm through the adjustment structure 78. Accordingly, the frictional resistance between the movable device 70 and the fixing device 50 which is increased and decreased in response to the pressing force Fzp can be arbitrarily adjusted by the adjustment structure. Therefore, when the frictional resistance generated with the movement of the movable device 70 is optimized, the operation feeling to the operation for moving the operation knob 73 with the input of the operation input force can be achieved. Moreover, with the optimization of the pressing force Fzp, the slider is in a state where the preload acts on the slider. Therefore, the situation in which the sliding protrusion 76 of the slider 75 is separated from the sliding surface 51d due to, for example, the vibration caused by the external can be avoided.

In addition, with regard to the first embodiment, the position of the inner yoke 71 in the z-axis direction adjusted by the adjustment structure 78 can be maintained even if the movable device 70 moves. Thus, the adjustment structure 78 can adjust the magnetic attraction force Fzm over the entire movable range of the movable device 70. According to the above configuration, even when the weight of, for example, the operation knob 73 is increased or decreased along with a change in the specification of the operation input apparatus 100, the pressing force Fzp acting on the sliding surface 51d from the sliding protrusion 76 falls within an appropriate range. Accordingly, the effect of improving the feeling to the operation for moving the movable device 70 can be achieved over the entire movable range.

In addition, according to the first embodiment, each of the magnetized surfaces 68 on the two respective magnets 61, 62 is opposed to the first opposing surfaces 51a, 52a individually. Similarly, each of the magnetized surfaces 68 on the respective two magnets 63, 64 is opposed to the second opposing surfaces 51b, 52b individually. Therefore, the magnetic attraction force Fzm caused by the magnets 63, 64 and the magnetic attraction force −Fzm caused by the magnets 62, 64 are configured to act in reverse direction along the z-axis. With the above configuration, the adjustment of the total force of the magnetic attraction force Fzm can be carried out by moving the position of the magnets 61 to 64 relative to the outer yokes 51, 52 along the z-axis and changing the distance between the magnetized surface 68 and each of the opposing surfaces 51a, 52a, 51b, 52b respectively. Accordingly, the increase or decrease in the pressing force Fzp through adjusting the direction and magnitude of the magnetic attraction force Fzm can be achieved by the adjustment structure 78 with a simpler configuration.

Moreover, in the first embodiment, the upper arm outer yoke 51 may be one part of the movable device 50, and the movable device 70 is supported by the sliding surface 51d arranged at the upper arm outer yoke 51. With this type of configuration, since the number of components for the operation input apparatus 100 is reduced, the simplification of the configuration is achieved. Furthermore, the miniaturization of the operation input apparatus 100 is achieved.

It is noted that, in the first embodiment, the operation input apparatus 100 corresponds to an "input apparatus"; the movable device 70 corresponds to an "input device"; and the fixing device 50 corresponds to a "support device." In addition, the magnets 61 to 64 correspond to a "magnetic formation part"; the first coil 431 and the second coil 42 correspond to a "coil part"; and the reaction force generator 39 corresponds to a "reaction force generator." Furthermore, the upper arm outer yoke 51 and the lower arm outer yoke 52 correspond to a "magnetic flux induction part"; and the first opposing surfaces 51a, 52a and the second opposing surfaces 51b, 52b correspond to an "opposing surface."

Second Embodiment

Figure 7:
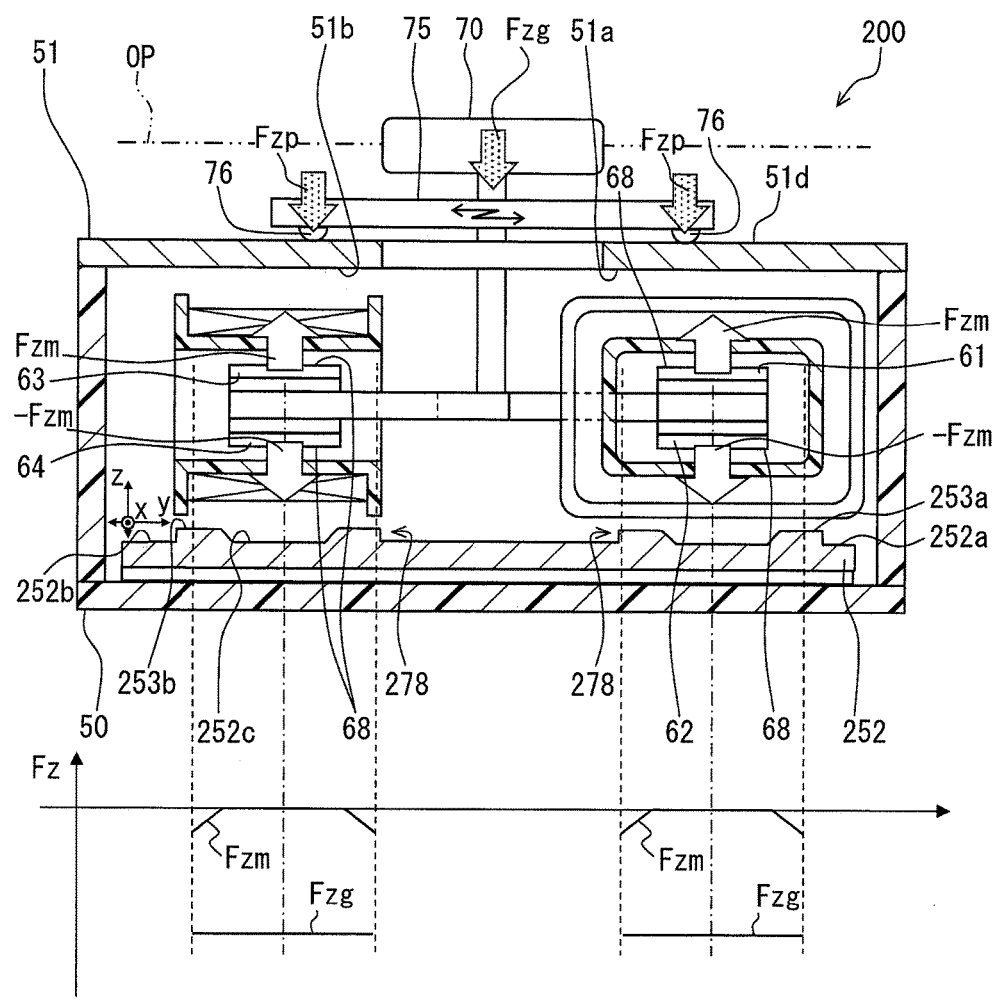
FIG. 7 is a cross section view that illustrates a mechanical configuration of an operation input apparatus according to a second embodiment.
Figure 8:
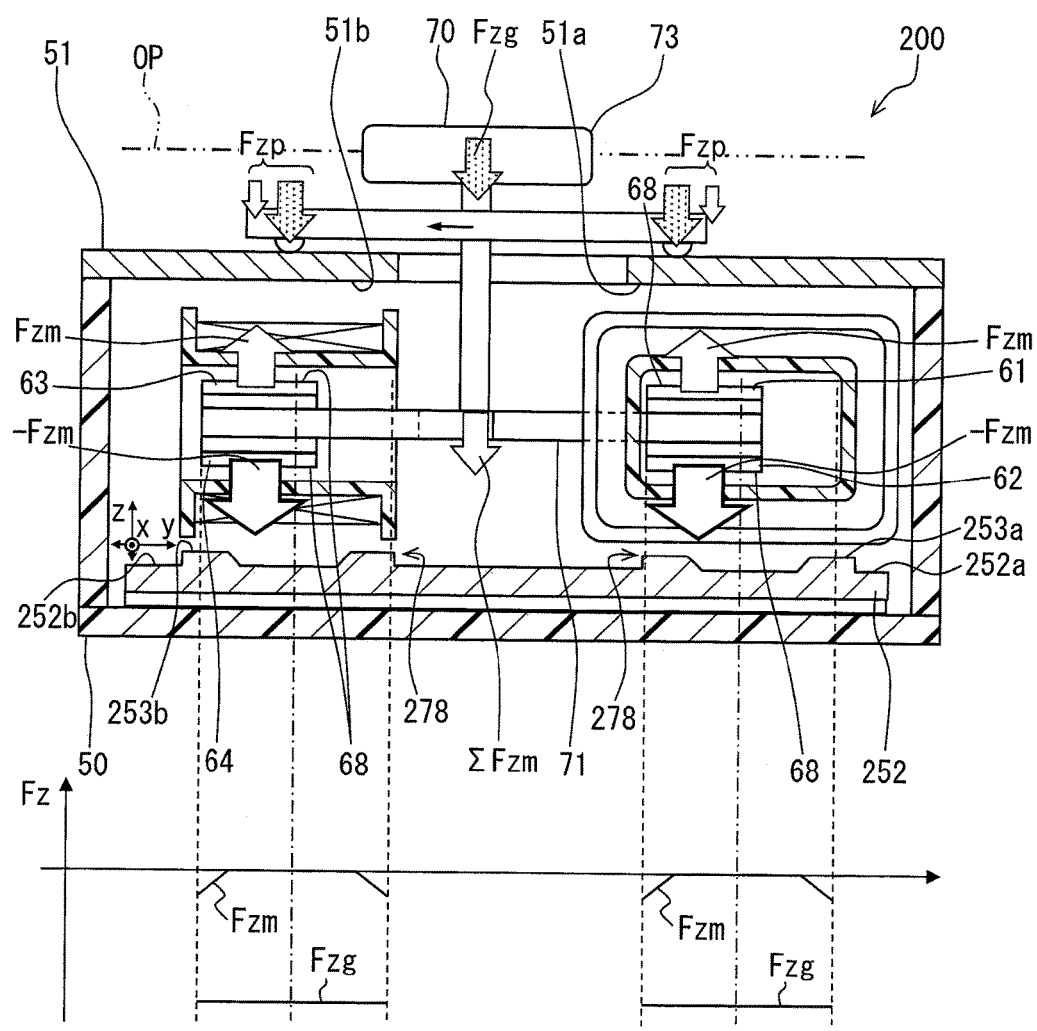
FIG. 8 is a drawing that illustrates working mechanism in which an adjustment structure according to a second embodiment increases a magnetic attraction force in a downward direction at an outer edge region of a moveable range.

A second embodiment of the present disclosure illustrated in FIG. 7 and FIG. 8 is different from the first embodiment. With regard to an operation input apparatus 200 according to the second embodiment, a first opposing surface 252a and a second opposing surface 252b arranged at the lower arm outer yoke 252 is configured as an adjustment structure 278. The following describes the adjustment structure 278 according to the second embodiment in detail.

As illustrated in FIG. 7, protruding surfaces 253a, 253b are respectively arranged at the opposing surfaces 252a, 252b of the lower arm outer yoke 252. The protruding surfaces 253a, 253b are formed to protrude to the upper side in the z-axis direction toward the magnetized surface 68 from a reference surface 252c of the lower arm outer yoke 252. The protruding surface 253a is extended and formed into a rectangular loop shape so as to be opposed in the z-axis direction to the magnetized surface 68 of the magnet 62, which has been moved maximally in the x-axis direction and the y-axis direction as shown in FIG. 8. The protruding surface 253b is extended and formed into a rectangular loop shape so as to be opposed in the z-axis direction to the magnetized surface 68 of the magnet 64, which has been moved maximally in the x-axis direction and the y-axis direction.

The above adjustment structure 278 can increase or decrease the total of the magnetic attraction force Fzm in response to the moving position of the movable device 70, which moves along the operation plane OP. In particular, the adjustment structure 278 can adjust the total of the magnetic attraction force Fzm so that the pressing force Fzp exerted by the movable device 70 located at the outer edge region of the movable range gets larger than the pressing force Fzp exerted by the movable device (see FIG. 7) located at the central region of the movable range. The following describes the mechanism and effects.

As shown in FIG. 7, in a case where the movable device 70 is located at the reference position at the center, the magnetic attraction force Fzm in the upward direction exerted by the magnets 61, 63 and the magnetic attraction force −Fzm in the downward direction exerted by the magnets 62, 64 are substantially in a balanced state in the z-axis direction. Therefore, the movable device 70 causes the plurality of sliding protrusions 76 of the slider to press on the sliding surface 51d with the load Fzg exerted by the movable device 70.

On the other hands, when a stroke is given to the operation knob 73 in the y-axis direction as shown in FIG. 8, the distance between the magnetized surface 68 of the magnet 62 and the first opposing surface 252a of the lower arm outer yoke 252 gets shorter due to the protruding shape of the protruding surface 253a. Accordingly, the magnetic attraction force −Fzm in the downward direction acting on the magnet 62 is increased. Similarly, the distance between the magnetized surface 68 of the magnet 64 and the second opposing surface 252b of the lower arm outer yoke 252 gets shorter due to the protruding shape of the protruding surface 253b. Accordingly, the magnetic attraction force −Fzm in the downward direction acting on the magnet 64 is also increased.

On the other hands, the distance between each of the magnetized surface 68 respectively on the two magnets 61, 63 and the each of the opposing surfaces 51a, 51b of the upper arm outer yoke 51 is maintained even when a stroke is given to the operation knob 73. Therefore, the magnetic attraction force Fzm in the upward direction acting on each of the magnets 61, 63 is substantially fixed. As a result, the total of the magnetic attraction force Fzm acts on the inner yoke 71 in the downward direction (see ΣFzm in FIG. 8). With a change in the total of the magnetic attraction force Fzm, the pressing force Fzp gets larger at the outer edge region of the movable range defined by the movable device 70. Therefore, it is possible that the braking force caused by an increase in the frictional resistance can act on the movable device that moves to the outer edge region.

In the second embodiment as described above, the pressing force between the movable device 70 and the fixing device 50 is increased or decreased with the adjustment of the total of the magnetic attraction force Fzm through the adjustment structure 278. As a result, the frictional resistance generated with the movement of the movable device 70 can be arbitrarily adjusted to achieve optimization so that the operation feeling to the operation of the operation knob can be improved.

According to the adjustment structure 278 according to the second embodiment, it is possible that the braking force can act on the moveable device, which moves to the outer edge region of the movable range. With the braking action caused by the frictional resistance, the damage of the operation input apparatus 200 caused by the collision of the movable device 70 to the part of the fixing device 50, which defines the movable range, can be avoided.

In the second embodiment, the adjustment structure 278 for carrying out the braking action at the outer edge region can be realized by the simple configuration with the formation of the protruding surfaces 253a, 253b.

In the second embodiment, the operation input apparatus 200 corresponds to an "input apparatus." Moreover, both of the lower arm outer yoke 252 and the upper arm outer yoke 251 correspond to a "magnetic flux induction part." The opposing surfaces 252a, 252b and the opposing surfaces 51a, 51b correspond to "opposing surfaces."

Third Embodiment

Figure 9:
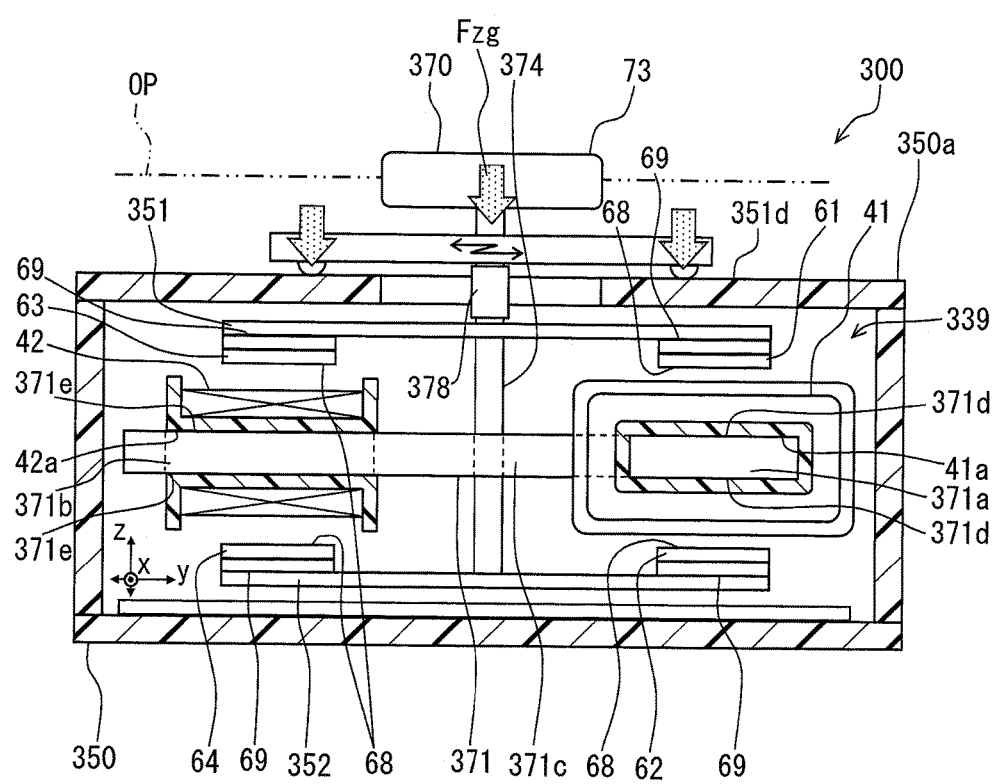
FIG. 9 is a cross section view that illustrates a mechanical configuration of an operation input apparatus according to a third embodiment.
Figure 10:
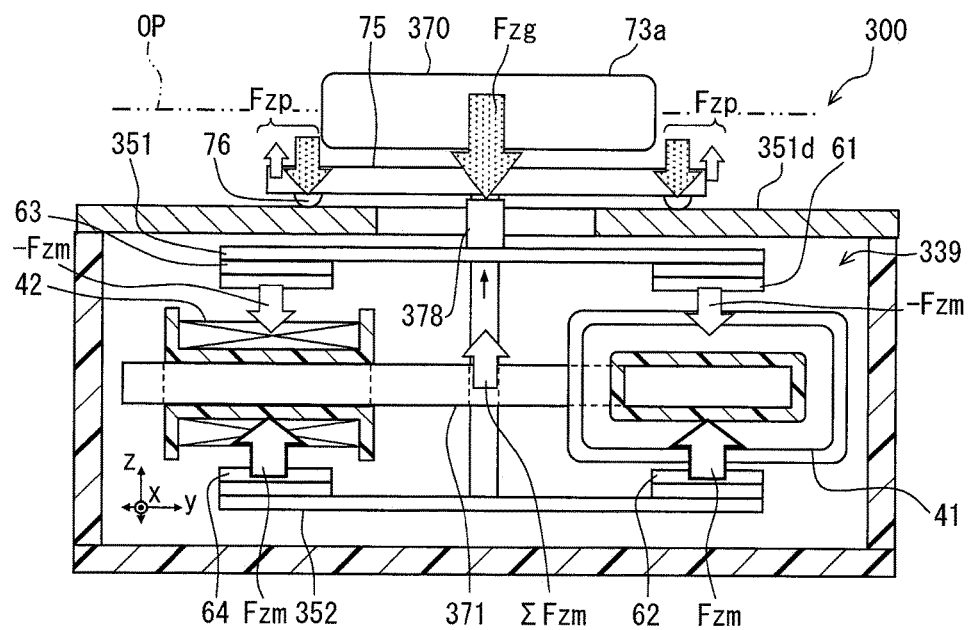
FIG. 10 is a drawing that illustrates working mechanism in which a pressing force is reduced by an adjustment structure in accordance with a specification having a large-scale operation knob.
Figure 11:
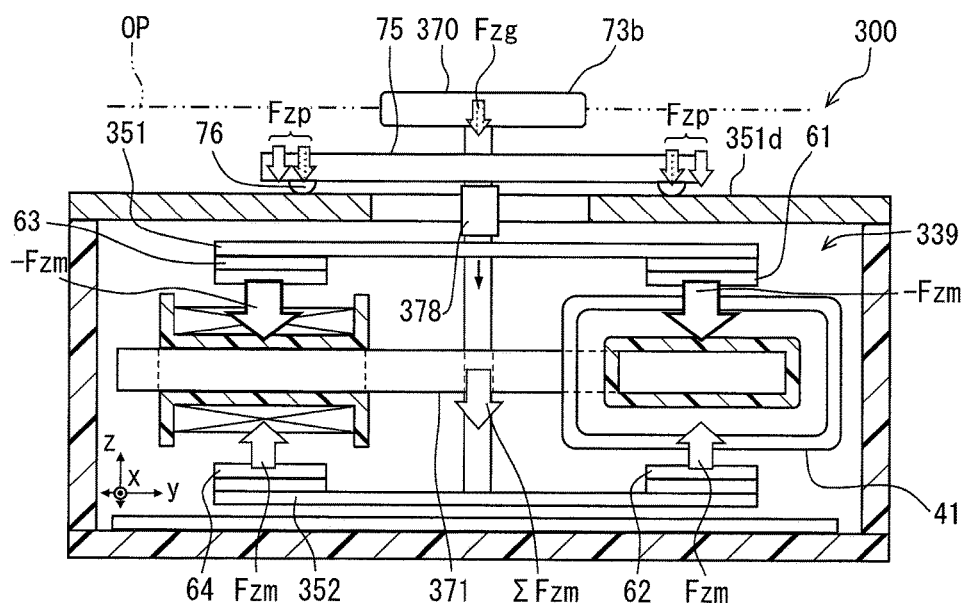
FIG. 11 is a drawing that illustrates working mechanism in which a pressing force is increased in accordance with a specification having a small-scale operation knob.

A third embodiment of the present disclosure illustrated in FIGS. 9 to 11 is a modification example of the first embodiment. In a reaction force generator 339 of an operation input apparatus 300 according to the third embodiment, the magnets 61 to 64 are arranged at the outer circumferential side of the coils 41, 42 respectively. The reaction force generator 339 includes an inner yoke 371, an upper arm outer yoke 351 and an lower arm outer yoke 352, which respectively correspond to each of the yokes 71, 51, 52 (see FIG. 3) in the first embodiment.

The inner yoke 371 illustrated in FIG. 9 holds the coils 41, 42. The inner yoke 371 includes: a first coil side yoke part 371a stored in the accommodation chamber 41a; a second coil side yoke part 371b stored in the accommodation chamber 42a, and a connecting part 371c that connects the first coil side yoke part 371a and the second coil side yoke part 371b. A pair of first opposing surfaces 371d, which are respectively opposed to the magnetized surfaces 68 individually arranged at the magnets 61, 62 in the z-axis direction, are respectively arranged at the both surfaces of the first coil side yoke part 371a. A pair of second opposing surfaces 371e, which are respectively opposed to the magnetized surfaces 68 individually arranged at the magnets 63, 64 in the z-axis direction, are respectively arranged at the both surfaces of the second coil side yoke part 371e.

Attaching surfaces 69 individually arranged at the two magnets 61, 63 are arranged at the both end parts of the upper arm outer yoke 351 in the longitudinal direction. Thus, the upper arm outer yoke 351 holds the magnets 61, 63. The upper arm outer yoke 351 is stored in a housing 350a. The part corresponding to the sliding surface 51d in the first embodiment (see FIG. 3) is omitted from the upper arm upper yoke 351. In the third embodiment, a sliding surface 351d for supporting the housing 350a to be slidable is arranged at the upper surface of the housing 350a.

Attaching surfaces 69 individually arranged at the two magnets 62, 64 are arranged at the both end parts of the lower arm outer yoke 352 in the longitudinal direction. Accordingly, the lower arm outer yoke 352 holds the magnets 62, 64. The lower arm outer yoke 352 and the upper arm outer yoke 351 are attached to a knob base 374 so as to be movable along the operation plane OP.

The operation input apparatus 300 includes an adjustment structure 378, which is substantially identical to the adjustment structure 78 of the first embodiment (see FIG. 3). As illustrated in FIG. 10, when the adjustment structure 378 controls the position of each of the outer yokes 351, 352 to the operation knob 73a, the distance between the magnets 62, 64 and the inner yoke 371 becomes shorter than the distance between the magnets 61, 63 and the inner yoke 371. Accordingly, the magnetic attraction force Fzm in the upward direction becomes larger than the magnetic attraction force −Fzm in the downward direction. Accordingly, the total force of the magnetic attraction force Fzm (see ΣFzm in FIG. 10) is in the upward direction.

As described above, in the specification having a large scale operation knob 73a with a larger load Fzg, the pressing force obtained by a movable device 370 pressing the sliding surface 351d in the downward direction through the plurality of sliding protrusions 75 of the slider 75 is decreased due to the net force of the magnetic attraction force Fzm. As a result, the frictional resistance caused between each of the plurality of sliding protrusions 76 and the sliding surface 351d can be adjusted with the function of the adjustment structure 378 that corresponds to a case of having a standard operation knob 73 (see FIG. 9).

On the other hands, as shown in FIG. 11, when the adjustment structure 378 controls to the position of each of the outer yokes 351, 352 moving away from the operation knob 73b, the distance between the magnets 61, 63 and the inner yoke 371 becomes shorter than the distance between the magnets 62, 64 and the inner yoke 371. Accordingly, the magnetic attraction force −Fzm in the downward direction becomes larger than the magnetic attraction force Fzm in the upward direction. Accordingly, the total force of the magnetic attraction force (see ΣFzm in FIG. 11) is in the downward direction.

As described above, in the specification having a large scale operation knob 73b with a smaller load Fzg, the pressing force obtained by a movable device 370 pressing the sliding surface 351d in the downward direction through the plurality of sliding protrusions 75 of the slider 75 is increased due to the net force of the magnetic attraction force Fzm. As a result, the frictional resistance caused between each of the plurality of sliding protrusions 76 and the sliding surface 351d can be adjusted with the function of the adjustment structure 378 that corresponds to a case of having a standard operation knob 73 (see FIG. 9).

As similar to the first embodiment, in the third embodiment described above, the frictional resistance between the movable device 370 and the fixing device 350 can be arbitrarily adjusted by the adjustment structure 378. Accordingly, the improvement in the operation feeling to the operation for moving the operation knob 73 can be achieved. The effect in improving the operation feeling is similarly exhibited in the configuration where the magnets 61 to 64 are arranged at the outer circumferential side of the coils 41, 42 respectively.

In the third embodiment, the operation input apparatus 300 corresponds to an "input apparatus"; a movable device 370 corresponds to an "input device"; and the fixing device 350 corresponds to a "support device." In addition, the reaction force generator 339 corresponds to a "reaction force generator" Moreover, the inner yoke 371 corresponds to a "magnetic flux induction part"; and the first opposing surface 371d and the second opposing surface 371e correspond to an "opposing surface."

Other Embodiments

While the present disclosure has been described with reference to embodiments thereof, it is to be understood that the disclosure is not limited to the embodiments. The present disclosure is intended to cover various modification and equivalent arrangements within the scope of the present disclosure.

An input operation apparatus according to a first modification example of the first embodiment includes the lower arm outer yoke 252 according to the second embodiment illustrated in FIG. 7 in replacement of the lower arm outer yoke 52 (see FIG. 3). As described above, the adjustment structure arranged in the operation input apparatus may be a combination of a plurality of configurations such as the stretching mechanism and the protruding surface.

In the above embodiment, among the four magnets and the two coils, the magnets are attached to the movable device so as to be movable. However, the configuration attached to the movable device may be the coils as well. In a modification example 2 for representing this particular configuration, four magnets are attached to the inner yoke and stored in the accommodation chamber of each coil. On the other hands, the two coils are pinched by two outer yokes suspended by the knob base, and are movable with the movable device. In the configuration according to the second modification example, it is possible to arrange an adjustment structure for adjusting the positions of the outer yoke and the coil.

In the reaction force generator as described in the above embodiment, the electromagnetic forces EMF_x, EMF_y, which are generated by the application of current to each of the coils, increase or decrease according to the moving position of the input device, in particular, decrease toward the outer edge region of the movable range. With the relative movement of the coil and magnet, the magnetic flux density penetrating the coil is decreased. In a third modification example of the second embodiment, the protruding surface also acting as the adjustment structure is arranged at the upper arm outer yoke. The protruding surface corresponds to the protruding surfaces 253a, 253b provided at the lower arm outer yoke 252 in the second embodiment (see FIG. 7). In the above configuration, the magnetic attraction force Fzm in the upward direction is increased as the movable device moves to the outer edge region of the movable range. The adjustment structure such as the one in the third modification example adjusts the total of the magnetic attraction force so that the pressing force Fzp gets weaker toward the moving position as the so-called the outer edge region where the electromagnetic force generated by the reaction force generator becomes weaker. As a result, the frictional resistance acting on the movable device also becomes weaker at the outer edge region where the electromagnetic force generated by the reaction force generator gets smaller; therefore, the operation reaction force can be easily transmitted to the operator from the movable device. Accordingly, it is possible that a user hardly feels an increase or decrease in the electromagnetic force connected with the moving position of the movable device.

In the first embodiment and the third embodiment, the pressing force Fzp at an arbitrary positional coordinate is increased or decreased with a predetermined amount through the adjustment of the position of the inner yoke or each outer yoke in the z-axis direction. The increase or decrease in the pressing force Fzp is not only restricted to the above positional adjustment, but the increase or decrease in the pressing force Fzp may be achieved by, for example, the angle of the magnet with respect to the opposing surface of the yoke (oblique state), a change in the thickness of the yoke such as the one in the second embodiment, the adjustment of the lapping amount of the yoke and the magnet, and a change in the material of the yoke.

In the modification example of the above embodiment, the display system includes the navigation device and the head-up display device 120 shown in FIG. 2 in replacement of the navigation device. The head-up display device 120 is stored in the instrument panel of the vehicle in front of the driver's seat, and displays a virtual image of an image by projecting the image toward a projection region 120 defined inside the window shield region. The operator sitting on the driver's seat can visualize, for example, a pointer 80 for selecting a plurality of icons connected with a predetermined function or an arbitrary icon through the projection region 122. The pointer 80 can move within the projection region 122 in a direction corresponding to the input direction of the operation force through the operation input to the operation knob 73 in a horizontal direction, as similar to the case where the pointer 80 is displayed on the display screen 22.

A variety of well-known configurations can be applied to the stretching mechanism to be used in the adjustment structure according to the first and third embodiments. For example, the stretching mechanism may be configured as a telescopic structure to be stretched in an axial direction by inserting one of two cylindrical members, which both have the similar shape at the cross section, into another one of the two cylindrical members. Subsequently, the stretching mechanism can set the position of the inner yoke at an arbitrary height in the z-axis direction by, for example, fastening of screws or caulking.

The reaction force generator according to the embodiment is arranged by the combining two voice coil motors. However, the number of voice coil motors arranged in the reaction force generator may be one, or three or more. In the above embodiment, one magnet forms one "magnetic pole formation part." However, the combination of the plurality of magnets may be configured as one "magnetic formation part." Moreover, the magnetic poles may be directly magnetized on both of the inner yoke and the outer yoke.

The above embodiments describe the example of applying the present disclosure to the operation input apparatus, which is arranged at the center console, as a remote operation device for operating, for example, a navigation device. However, the present disclosure may be applied to a selector such as a shift lever arranged at the center console or a steering switch provided for steering. In addition, the present disclosure also can be applied to an arm rest provided at, for example, an instrument panel and a door, and a plurality of vehicular function operating devices provided at the vicinity of a back seat. Furthermore, the present disclosure is not restricted to the application for a vehicle, but the operation input apparatus applied by the present disclosure may also be used in a general operating system to be used in, for example, various types of transportation equipment and various types of information terminals.

What is claimed is:

1. An input apparatus comprising:
an input device that receives an input of operation force in a direction along an operation plane;
a support device that supports the input device to enable the input device to move along the operation plane through the input of the operation force;
a reaction force generator that includes:
a magnetic pole formation part that forms a magnetic pole;
a coil through which a magnetic flux generated by the magnetic pole formation part flows;
a magnetic flux induction part that inducts the magnetic flux generated by the magnetic pole formation part through the coil, and that exerts electromagnetic force, which is generated by an application of current to the coil, on the input device as operation reaction force in the direction along the operation plane; and
an adjustment structure that increases or decreases pressing force pressing the support device in a direction where the input device intersects the operation plane by adjusting a total of magnetic attraction force, which is obtained by the magnetic pole formation part attracting the magnetic flux induction part,
wherein the adjustment structure adjusts a position of the magnetic pole formation part.

2. The input apparatus according to claim 1, wherein the adjustment structure increases or decreases the total of the magnetic attraction force in accordance with a moving position to which the input device has moved along the operation plane.

3. The input apparatus according to claim 2, wherein:
the input device is limited to move in a movable range where the input device moves along the operation plane; and
the adjustment structure adjusts the total of the magnetic attraction force so that the pressing force exerted by the input device located at an outer edge portion of the movable range gets larger than the pressing force exerted by the input device located at a central portion of the movable range.

4. The input apparatus according to claim 2, wherein:
the electromagnetic force generated by the application of current to the coil in the reaction force generator is increased or decreased in accordance with the moving position of the input device; and
the adjustment structure adjusts the total of the magnetic attraction force such that the pressing force gets smaller as the input device moves to a position where the electromagnetic force generated by the reaction force generator gets smaller.

5. The input apparatus according to claim 1, wherein:
the input device is limited to move in a movable range where the input device moves along the operation plane; and
the adjustment structure adjusts the magnetic attraction force over an entire portion of the movable range.

6. The input apparatus according to claim 1, wherein:
the reaction force generator has two magnetic pole formation parts arranged along a z-axis direction perpendicular to the operation plane;
two magnetized surfaces are respectively arranged at the two magnetic pole formation parts;
the two magnetized surfaces are in directions different from each other in the z-axis direction; and
the magnetic flux induction part has a pair of opposing surfaces respectively opposed to the two magnetized surfaces in the z-axis direction and respectively receiving the magnetic attraction force from the two magnetized surfaces.

7. The input apparatus according to claim 6,
wherein the adjustment structure adjusts the total of the magnetic attraction force by changing a distance between one of the two magnetized surfaces and one of the pair of opposing surfaces, which are opposed to each other, and a distance between another one of the two magnetized surfaces and another one of the pair of opposing surfaces, which are opposed to each other.

8. The input apparatus according to claim 6, wherein:
a protruding surface, which is protruded to one of the two magnetized surfaces arranged opposite to the protruding surface, is arranged on at least one of the pair of opposing surfaces; and
the one of the pair of opposing surfaces having the protruding surface is used as at least one part of the adjustment structure.

9. The input apparatus according to claim 6,
wherein the magnetic flux induction part includes a sliding surface for supporting the input device to enable the input device to slide along the operation plane, and is used as at least one part of the support device.

10. The input apparatus according to claim 1, wherein:
the input device includes a knob and a knob base extending vertically from the knob and perpendicular to the operation plane, wherein the knob base holds a horizontally suspended inner yoke.

11. The input apparatus according to claim 10, wherein:
the horizontally suspended inner yoke includes two horizontal magnet-side yoke parts and a horizontal connecting part that connects the two horizontal magnet-side yoke parts.

12. The input apparatus according to claim 11, wherein:
the magnetic pole formation part is arranged so as to sandwich each of the two horizontal magnet-side yoke parts.

13. The input apparatus according to claim 10, wherein:
the adjustment structure adjusts a length of the knob base and as such a position of the horizontally suspended inner yoke.

14. The input apparatus according to claim 13, wherein:
the adjustment structure adjusts a frictional resistance caused by moving the input device by adjusting the position of the horizontally suspended inner yoke.

* * * * *